UNITED STATES PATENT OFFICE.

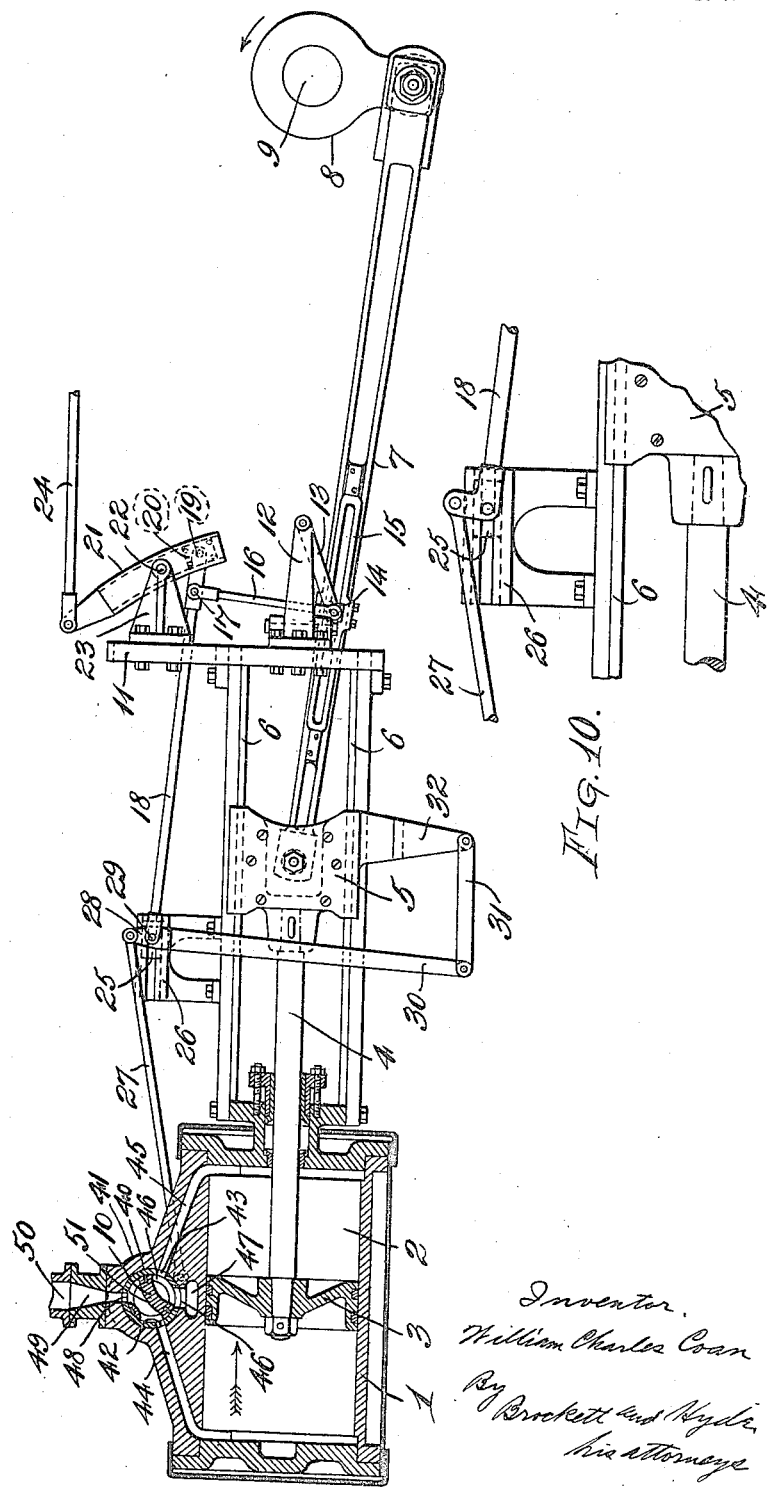

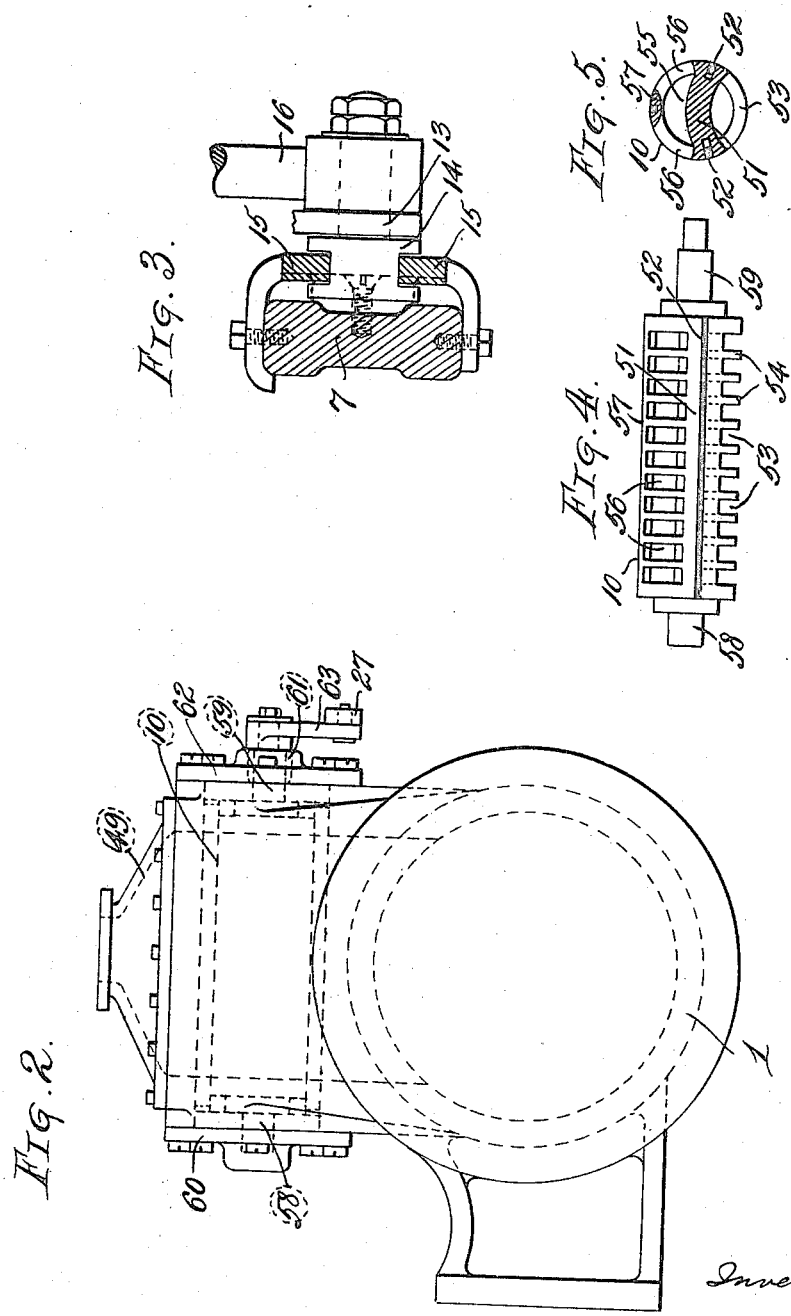

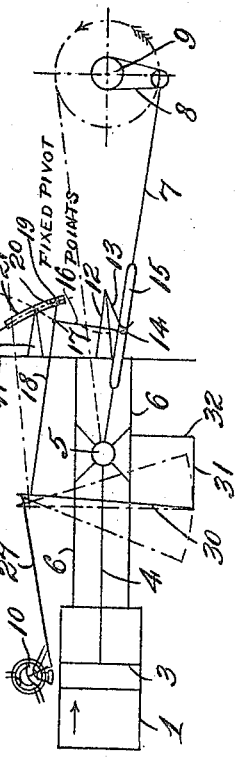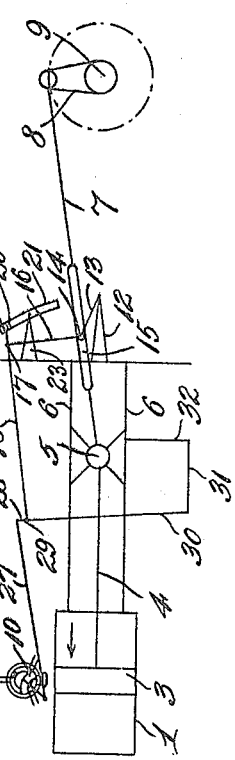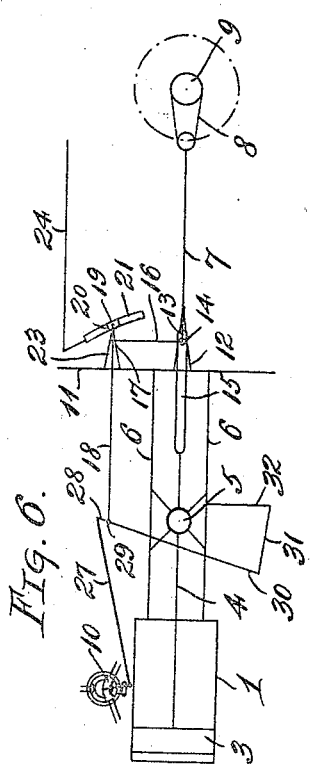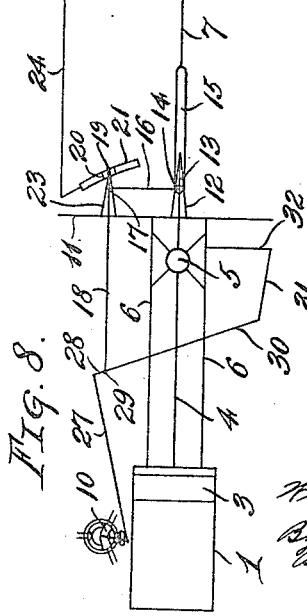

WILLIAM CHARLES COAN, OF CLEVELAND, OHIO, ASSIGNOR TO THE UNIVERSAL VALVE AND VALVE GEAR CO., OF CLEVELAND, OHIO, A CORPORATION OF OHIO.

STEAM-ENGINE VALVE AND VALVE-GEAR.

1,222,266.     Specification of Letters Patent.     Patented Apr. 10, 1917.

Application filed June 8, 1916.   Serial No. 102,501.

*To all whom it may concern:*

Be it known that I, WILLIAM CHARLES COAN, a citizen of the United States, residing at Cleveland, in the county of Cuyahoga and State of Ohio, have invented certain new and useful Improvements in Steam-Engine Valves and Valve-Gears, of which the following is a specification.

This invention relates to valves and valve gears for steam engines, and while capable of application for use on steam locomotives, may be applied to any form of steam engine.

The objects of the invention are to improve and simplify the valve construction to produce a more rapid and even-distribution of the steam with a quick port opening and cut off; to eliminate the usual eccentric from the valve gear and reduce or eliminate its centrifugal effects; to simplify and reduce the weight of valve gear; to secure an easy and quick reverse operation without the necessity of lifting or moving heavy parts; and finally to generally improve the valve gear and reduce its operating parts to a minimum with an arrangement thereof which secures maximum steam expansion for a longer period during the piston stroke to thereby increase efficiency. Further objects of the invention are in part obvious and in part will appear more in detail hereafter.

The invention comprises the valve and valve gear hereinafter described and claimed.

In the drawings Figure 1 illustrates an engine cylinder equipped with my improved valve and valve gear, the valve and engine cylinder being shown in longitudinal section and other parts in elevation; Fig. 2 is an end view of the engine cylinder from the left in Fig. 1; Fig. 3 is a cross section on the line 3—3 of Fig. 1; Fig. 4 is an enlarged detail view of the rotary valve member; Fig. 5 is a cross section thereof on the line 5—5 Fig. 4; Figs. 6, 7, 8 and 9 are line diagrams showing different positions of the valve and valve gear; and Fig. 10 is a detail view showing a modified form of slide block.

Referring to the drawings 1 represents the engine cylinder in whose chamber 2 moves the piston 3 connected by the piston rod 4 to the cross head 5 moving in guides 6, said cross head operating the connecting rod 7 connected to the crank 8 on the driven shaft 9, all as is usual in steam engines. At one side of the engine cylinder is the valve 10 controlling the steam supply and exhaust. This valve may be of any suitable type, either a sliding valve, a rotary valve, or any other form, but is shown as an improved valve of the rotary type, as will hereinafter appear. Said valve is operated by a valve gear now to be described.

As illustrated in the drawings the usual eccentric on the driven shaft 9 for operating the valve gear is omitted, and the valve gear is operated by the connecting rod 7, and more particularly by only the lateral movement of said rod. In the form shown the guide frame 11 is provided with a bracket 12 to which is hinged a rocking arm 13, the swinging end of said arm having pivotal connection to a block 14 which slides in a guide 15 extending longitudinally of the connecting rod and rigid therewith. Said guide may be an integral part of the connecting rod and formed by forging or otherwise forming a slot for the guideways therein, but, as illustrated is a separate piece attached to the connecting rod. This arrangement enables the invention to be applied to an old steam engine. Block 14 is pivotally connected to a link 16 whose opposite end is pivoted at 17 to the radius rod 18, the latter having one end pivotally connected at 19 to a link block 20 sliding in the radius link 21.

The radius link is hinged intermediate, its ends at 22 to a bracket 23 attached to the stationary frame, and is provided at one end with a pivotal connection to the reach rod 24, which may be operated manually by the engineer, or may be attached to any suitable form of governor (not shown) for automatic control of the engine, as will be more fully described.

The radius rod 18 is suitably connected to the steam valve 10 either being directly connected thereto or, as shown in Fig. 1, being pivotally connected to a slide block 25 working in a guide 26 attached to the frame. This block may be connected directly by a link 27 to the valve 10, as shown in Fig. 10, but, if desired, the valve gear may also be provided with suitable means for securing an accelerated lap and lead motion as shown in Fig. 1. In this case the accelerating lap and lead lever 28 is pivoted at 29 to the block 25. Its short arm is pivotally connected to the link 27 extending to the valve 10, while its long arm 30 is connected by a link 31 to a bracket 32 attached to the cross head. The lever 28 and link 31 interposed in the valve gear produce the usual lap and lead motion, and may be omitted or utilized as is most desirable.

The valve 10, as stated, is of the rotary type. It comprises a body portion having a cylindrical outer surface turning in a sleeve 40 secured in the valve casing 41, which is located at one side of the engine cylinder. Said sleeve is provided with two longitudinal slots 42, 43, communicating with wide slots 44, 45, opening into the opposite ends of the piston chamber 2. These wide slots give a large opening into the piston chamber and thorough distribution of the steam thereto. The sleeve 40 also has a bottom slot 46 communicating with an exhaust passage 47, and a top slot 48 communicating with the steam supply passage 49. The latter widens out from the steam supply conduit 50, as shown in Fig. 2, so as to permit full expansion of the steam through the valve to the engine cylinder.

The valve member itself is provided with a longitudinally extending transverse division wall 51 whose opposite edges are provided with packings 52. On one side of the said division wall the valve body is provided with a series of circumferentially extending ports 53, which may be formed by sawing into the body, said ports being separated by thin walls 54. On the opposite side of the division wall 51 the valve body is cored out to form a longitudinally extending passage 55 opening out through the wall of the valve body through two series of spaced ports 56, as shown in Figs. 4 and 5. The two series of ports are separated by a longitudinally extending bridge 57.

The valve body also has end journals 58, 59, one of which is inclosed in the valve casing and rotates in a head or cap 60 attached thereto, while the other journal 59, extends through a packing 61 in the opposite casing head 62 to the outside of said casing, where it is provided with a crank 63 pivotally attached to the link or rod 27.

The steam engine and valve gear described operate as follows:

Referring to the diagram Fig. 6 steam has been admitted to the left end of the engine cylinder, the piston 3 is moving to the right, and the shaft 9 is rotating in the direction of the arrow A. The steam supply passes through the ports 56 and passage 55 from the inlet to the wide slot 44, so that it has an unrestricted flow with full expansion and is evenly distributed to the piston chamber. As the cross head moves to the right in Fig. 6, the connecting rod moves to the right and downwardly, as in Fig. 7, but the lost motion connection between the block 14 and guide 15 on said connecting rod holds the valve gear practically stationary during the major portion of the stroke to the right. The valve is therefore held in full open position until very near the end of the stroke. Just before the gear reaches the position of Fig. 8 the connecting rod begins to have an appreciable lateral motion, which is transmitted to the block 14 and causes the upward movement of the block 20 in the inclined radius link. The longitudinal component of the motion of block 20 is transmitted through the links 18 and 27 to the valve, and said valve is turned to its opposite position, shown in Fig. 9, with a very quick motion. When passing through dead center position the longitudinal bridge 57 closes the steam supply port. As the valve reaches its new position the exhaust from the left hand end of the piston chamber is opened slightly before the inlet to the right hand end of said chamber is opened. Consequently back pressure is entirely avoided in the piston chamber.

The motion of the valve is secured by the sliding movement of the block 20 in the radius link 21 and not by an oscillating movement of said link as in ordinary form of reverse gear. The travel or stroke of valve 10 is diminished as the radius link 21 is moved by the reach rod 24 to a vertical position in Fig. 1, and when in vertical position the valve is said to be at dead center. When the valve stroke is reduced the inlet ports or openings are not so fully uncovered and the steam supply during the working stroke is diminished. Consequently this valve in addition to its ordinary functions, may be made to serve the purposes of the usual throttle valve, which may be omitted if desired. By connecting the reach rod 24 to a suitable steam engine governor, not shown, operated by the shaft 9 a uniform working speed may be secured. As the speed increases the governor moves the reach rod 24 to decrease the valve stroke and diminish the steam supply, while if the speed decreases the valve stroke is increased. The reach rod may, however, be operated manually by the engineer.

By shifting the radius link to a position in which its inclination is in the opposite direction, as shown in dotted lines in Fig. 7, the engine may be reversed, as will be readily understood.

The valve described secures a thorough and even distribution of the steam to the piston chamber, while the valve gear opens and closes said valve with a very quick movement at or near the ends of the piston stroke, and holds said valve open with a full steam supply to the piston chamber for a materially longer time than in prior engine strokes. Consequently the efficiency of the engine is largely increased, due to the full application of power over a greater portion of the engine stroke. The invention may be applied to old engines as well as embodied in new construction.

What I claim is:—

1. In a steam engine, a cylinder, a piston and connecting rod, a valve controlling the steam supply and exhaust, and a valve gear, comprising an arm swinging about a relatively fixed pivot, a link pivotally connected to said arm, a block connected to said link, guideways for said block on said connecting rod whereby the block slides in the connecting rod and imparts lateral motion to said link as the rod reciprocates, and means whereby the lateral motion of said link operates said valve.

2. In a steam engine, a cylinder, a piston and connecting rod, a valve controlling the steam supply and exhaust, and a valve gear, comprising an arm swinging about a relatively fixed pivot, a link pivotally connected to said arm, a block connected to said link, guideways for said block on said connecting rod whereby the block slides in the connecting rod and imparts lateral motion to said link as the rod reciprocates, a relatively stationary quadrant, a quadrant block reciprocating therein and operated by said link, and means connecting said quadrant block to the valve for operating the same.

3. In a steam engine, a cylinder, a piston and connecting rod, a valve controlling the steam supply and exhaust, and a valve gear, comprising an arm swinging about a relatively fixed pivot, a link pivotally connected to said arm, a block connected to said link, guideways for said block on said connecting rod whereby the block slides in the connecting rod and imparts lateral motion to said link as the rod reciprocates, a relatively stationary quadrant, a quadrant block reciprocating therein and operated by said link, means connecting said quadrant block to the valve for operating the same, and means for varying the inclination of said quadrant.

In testimony whereof I affix my signature.

WILLIAM CHARLES COAN.

Copies of this patent may be obtained for five cents each, by addressing the "Commissioner of Patents, Washington, D. C."